United States Patent
Fujimoto et al.

(10) Patent No.: US 9,555,843 B2
(45) Date of Patent: Jan. 31, 2017

(54) WORK VEHICLE

(71) Applicant: Kubota Corporation, Osaka-shi (JP)

(72) Inventors: Hiroo Fujimoto, Sakai (JP); Tatsuyuki Kashimoto, Sakai (JP); Yutaka Inubushi, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 14/783,567

(22) PCT Filed: Mar. 12, 2014

(86) PCT No.: PCT/JP2014/056444
§ 371 (c)(1),
(2) Date: Oct. 9, 2015

(87) PCT Pub. No.: WO2014/167930
PCT Pub. Date: Oct. 16, 2014

(65) Prior Publication Data
US 2016/0059912 A1 Mar. 3, 2016

(30) Foreign Application Priority Data
Apr. 10, 2013 (JP) .................. 2013-082181

(51) Int. Cl.
*B62D 49/08* (2006.01)
*B62D 49/06* (2006.01)

(52) U.S. Cl.
CPC ........... *B62D 49/08* (2013.01); *B62D 49/0628* (2013.01)

(58) Field of Classification Search
CPC ..................... B62D 49/08; B62D 49/0628
See application file for complete search history.

(56) References Cited

U.S. PATENT DOCUMENTS

| 3,614,135 | A | * | 10/1971 | Eid | B62D 49/085 220/3.94 |
|---|---|---|---|---|---|
| 3,853,231 | A | * | 12/1974 | Luttrell | E02F 9/18 280/759 |
| 4,026,378 | A | * | 5/1977 | DePriester | B60K 1/04 180/68.5 |
| 4,232,883 | A | * | 11/1980 | Bourgeous | B62D 49/085 180/291 |
| 4,518,305 | A | * | 5/1985 | Stuhrmann | B62D 49/0628 212/196 |
| 4,692,086 | A | * | 9/1987 | Morita | B66F 9/07513 280/759 |

(Continued)

FOREIGN PATENT DOCUMENTS

| JP | 5525567 U1 | 2/1980 |
|---|---|---|
| JP | 59153668 A | 9/1984 |

(Continued)

*Primary Examiner* — Darlene P Condra
(74) *Attorney, Agent, or Firm* — The Webb Law Firm (57) ABSTRACT

Disclosed is a work vehicle having a weight that can be attached to a vehicle body frame. The weight is attached in such a manner that, over an entire length in a front/rear direction of the vehicle body and in a vertical direction of the vehicle body, an upper end portion of the weight is disposed in a same position as or upwardly of a lower end portion of the vehicle body frame, and at the same time in a same position as or downwardly of an upper end portion of the vehicle body frame.

13 Claims, 9 Drawing Sheets

(56) References Cited

U.S. PATENT DOCUMENTS

| | | | | |
|---|---|---|---|---|
| 5,897,138 | A | * | 4/1999 | Hall ................. B62D 37/04 |
| | | | | 280/759 |
| 6,027,139 | A | * | 2/2000 | Malinowski, Jr. ...... B60R 13/01 |
| | | | | 280/759 |
| 6,035,941 | A | * | 3/2000 | Hirooka ............... B62D 49/02 |
| | | | | 172/273 |
| 6,047,791 | A | * | 4/2000 | Hoebelheinrich .. B66F 9/07554 |
| | | | | 187/222 |
| 7,168,740 | B2 | * | 1/2007 | Kobayashi ......... B66F 9/07554 |
| | | | | 212/178 |
| 8,118,326 | B2 | * | 2/2012 | Moore ................. A01D 34/82 |
| | | | | 280/759 |
| 2008/0197614 | A1 | * | 8/2008 | Connors ............. B60P 3/2205 |
| | | | | 280/759 |
| 2010/0117346 | A1 | * | 5/2010 | Bauer ................. B62D 49/085 |
| | | | | 280/758 |
| 2014/0265412 | A1 | * | 9/2014 | Ellis ..................... B60R 9/00 |
| | | | | 296/39.2 |

FOREIGN PATENT DOCUMENTS

| | | | | |
|---|---|---|---|---|
| JP | 63202572 | U | | 12/1988 |
| JP | 229843 | U | | 2/1990 |
| JP | 342792 | U | | 4/1991 |
| JP | 10-028421 | A | * | 7/1996 |
| JP | 2002248958 | A | * | 9/2002 |
| JP | 2006193940 | A | | 7/2006 |

* cited by examiner

WORK VEHICLE

CROSS-REFERENCE TO RELATED APPLICATIONS

This application is the United States national phase of International Application No. PCT/JP2014/056444 filed Mar. 12, 2014, and claims priority to Japanese Patent Application No. 2013-082181 filed Apr. 10, 2013, the disclosures of which are hereby incorporated in their entirety by reference.

TECHNICAL FIELD OF THE INVENTION

The present invention relates to a work vehicle having a weight attached to a vehicle body frame.

BACKGROUND OF THE INVENTION

With a work vehicle described above, for instance, for the sake of improvement in stability of the vehicle body or traction, the weight is attached to its vehicle body frame. And, conventionally, the weight is attached between a front attaching portion disposed on a front side of the vehicle body frame and a rear attaching portion disposed on a rear side of the vehicle body frame, thus extend the weight under the bottom side of the vehicle body frame (see e.g. Patent Document 1).

With the work vehicle disclosed in this Patent Document 1, the weight includes a front attachment portion to be attached to the front attaching portion of the vehicle body frame, a rear attachment portion to be attached to the rear attaching portion of the vehicle body frame, and an intermediate portion interconnecting the front attachment portion and the rear attachment portion. And, each one of the front attachment portion and the rear attachment portion of the weight is formed to extend upwardly from the intermediate portion, and the weight is disposed with forming a gap between the intermediate portion and the lower end portion of the vehicle body frame in the vertical direction.

Further, according to another known work vehicle, its vehicle body frame includes a pair of right and left front frames spaced apart from each other along a vehicle body lateral width direction and extending along a vehicle body front/rear direction. An engine is supported by the pair of right and left front frames. A weight is attached to the pair of right and left front frames (see, e.g. Patent Document 2).

In the case of the work vehicle disclosed in this Patent Document 2, the weight is disposed between the pair of right and left front frames, with an upper end portion of the weight projecting upward beyond upper end portions of the front frames, and with a lower end portion of the weight projecting downward beyond lower end portions of the front frames. A front-axle support metal is fixed to the lower end portion of the weight; and a battery is mounted on the upper end portion of the weight.

PRIOR ART DOCUMENTS

Patent Documents

Patent Document 1: Japanese Unexamined Patent Application Publication No. 59-153668 (JP 59-153668 A)
Patent Document 2: Japanese Unexamined Utility Model Application Publication No. 3-042792 (JP 3-042792 U1)

SUMMARY OF THE INVENTION

Problem to be Solved by the Invention

In the case of the work vehicle disclosed in Patent Document 1, a gap is formed in the vertical direction between the intermediate portion of the weight and the lower end portion of the vehicle body frame. So that, the weight projects significantly downwards from the lower end portion of the vehicle body frame. Therefore, there is possibility of the vehicle body becoming unstable due to increase in the vehicle body height as such increase of body height is needed for avoiding contact between the weight and the ground surface. Also, in the case of the work vehicle disclosed in Patent Document 1, between the front attachment portion and the rear attachment portion of the weight in the vehicle body front/rear direction, a gap is formed between the intermediate portion of the weight and the lower end portion of the vehicle body frame, so foreign substance such as soil, mud or the like is apt to enter this gap.

In the case of the work vehicle disclosed in Patent Document 2, the upper end portion of the weight projects upward beyond upper end portions of the front frames. Therefore, there is a need to secure a weight disposing space upwardly of the upper end portions of the front frames also, thus inviting enlargement of the weight disposing space. In particular, in the case of the work vehicle disclosed in Patent Document 2, there is provided a hood forming an engine room upwardly of the front frames. Thus, a weight disposing space needs to be secured in the engine room also, thus inviting reduction in disposing space for other devices which are to be disposed inside the engine room.

Therefore, there is a need to attach a weight to the vehicle body frame in such a manner that the downward projecting amount from the lower end portion of the vehicle body frame is minimized so as not to form a gap allowing intrusion of soil, mud or the like, relative to the vehicle body frame, and without projecting upwards beyond the upper end portion of the vehicle body frame.

Solution to the Problem

In one preferred embodiment, according to a characterizing feature, a work vehicle comprises:
a vehicle body frame; and
a weight that can be attached to a vehicle body frame;
wherein when the weight is attached to the vehicle body frame, over an entire length in a front/rear direction of the vehicle body and in a vertical direction of the vehicle body, an upper end portion of the weight is disposed in a same position as or upwardly of a lower end portion of the vehicle body frame, and at the same time in a same position as or downwardly of an upper end portion of the vehicle body frame.

With the above-described arrangement, since the upper end portion of the weight is disposed in a same position as a lower end portion of the vehicle body frame or upwardly of the lower end portion of the vehicle body frame, downward projecting of the upper end portion of the weight beyond the lower end portion of the vehicle body frame can be minimized. Moreover, as the upper end portion of the weight is disposed at a same position as the lower end portion of the vehicle body frame or upwardly of the lower end portion of the vehicle body frame over the entire length of the vehicle body in the front/rear direction, a gap will hardly be formed between the upper end portion of the weight and the lower end portion of the vehicle body frame, so that formation of a gap allowing intrusion of soil, mud or the like relative to the vehicle body frame can be prevented. Furthermore, since the upper end portion of the weight is located in a same position as an upper end portion of the vehicle body frame or downwardly of the upper end portion of the vehicle body frame, upward projecting of the upper end portion of the weight beyond the upper end portion of the vehicle body frame can be prevented.

In one preferred embodiment, according to a further characterizing feature of the work vehicle, a front axle case is connected to a front side of the vehicle body frame, and the weight is disposed at a position overlapped with the front axle case in the vehicle body front/rear direction.

With the above-described arrangement, since the weight is disposed at a position overlapped with the front axle case in the vehicle body front/rear direction, the load of the weight can be supported directly by the front axle case. Therefore, it is possible to cause the load of the weight to act on front wheels effectively.

In one preferred embodiment, according to a still further characterizing feature of the work vehicle, the vehicle body frame includes a pair of right and left front frames spaced apart from each other along a vehicle body lateral width direction and extending in the vehicle body front/rear direction;

the front axle case is connected to the front frames; and the weight is attached to be engaged between the pair of right and left front frames in the vehicle body lateral width direction.

With the above-described arrangement, since the weight can be attached to be engaged between the pair of right and left front frames, the attachment of the weight is made possible with effective utilization of the space between the pair of right and left front frames. Moreover, it is also possible to utilize the front frames for supporting the weight. Thus, in addition to effective utilization of space, simplification of supporting arrangement can also be achieved.

In one preferred embodiment, according to a still further characterizing feature of the present invention, the weight includes an inner space formed inside thereof, and a first communicating portion and a second communicating portion which communicate the inner space with an outside of the weight; and there is provided an extension member disposed to extend in the vehicle body front/rear direction via the weight, the extension member being extended via the first communicating portion from the outside of the weight into the inner space and extended via the second communicating portion from the inner space of the weight to the outside.

With the above-described arrangement, for disposing the extension member to extend in the vehicle body front/rear direction, this disposing can be effected with utilization of the inner space of the weight. Therefore, the weight can be utilized as a support member for disposing the extension member. As a result, the arrangement can be simplified correspondingly.

In one preferred embodiment, according to a still further characterizing feature of the work vehicle, the weight includes a discharge opening for discharging retained water retained in its inner space to the outside.

With the above-described arrangement, even water or the like is retained in the inner space of the weight, this can be discharged to the outside through the discharge opening. As a result, soling of the inner space can be prevented and deterioration of weight can be restricted.

In one preferred embodiment, according to a still further characterizing feature of the work vehicle, the weight is configured to be attachable with its upper end portion being placed in contact with a lower end portion of a transmission case constituting the vehicle body frame.

With the above-described arrangement, as the upper end portion of the weight is placed in contact with the lower end portion of the transmission case, the weight can be attached without forming any gap between the upper end portion of the weight and the lower end portion of the transmission case. With this, the downward projection amount of weight from the lower end portion of the vehicle body frame can be minimized and also formation of gap allowing intrusion of soil, mud or the like relative to the transmission case can be prevented.

In one preferred embodiment, according to a still further characterizing feature of the work vehicle, the weight is dividable into a plurality of separate members, and when the plurality of separate members are attached, lower end portions of the respective separate members are disposed at a same position in the vertical direction.

If the weight to be attached has a large weight, the operation for attaching this weight will be very troublesome. Then, in the case of the above-described characterizing feature, the weight is divided into a plurality of separate members. And, by attaching these separate members individually, improvement of working efficiency can be achieved. Further, as lower end portions of the respective separate members are disposed at a same position in the vertical direction when these separate members are attached, there is formed no unevenness in the lower end portions of the respective separate members, so inadvertent hooking of a foreign object or the like can be prevented.

According to one preferred embodiment, a work vehicle comprises:

a pair of right and left front frames which constitute a vehicle body frame and which are spaced apart from each other in a vehicle body lateral width direction and extend in a vehicle body front/rear direction; and a weight that can be attached to the front frames;

wherein when the weight is attached to the front frames, an upper end portion of the weight is disposed in a same position as an upper end portion of the front frames or downwardly of the upper end portion of the front frames, in a vertical direction of the front frames.

In the above, still preferably, when the weight is attached to the front frames, the lower end portion of the weight is disposed in a same position as or upwardly of lower end portions of the front frames.

According to one preferred embodiment, a work vehicle comprises:

a transmission case constituting a vehicle body frame; and a weight that can be attached to the transmission case;

wherein when the weight is attached to the transmission case, an upper end portion of the weight is disposed in a same position as or upwardly of a lower end portion of the transmission case in a vertical direction of the transmission case.

Further and other characterizing features and advantageous effects achieved thereby will become apparent upon reading the following description with reference to the accompanying drawings.

EMBODIMENTS FOR CARRYING OUT THE INVENTION

Next, respective embodiments will be described with reference to the accompanying drawings. In the following description, a tractor is shown as an example of a work vehicle. It is understood, however, that the work vehicle related to the present invention is not limited to a tractor.

First Embodiment

Figure 1:
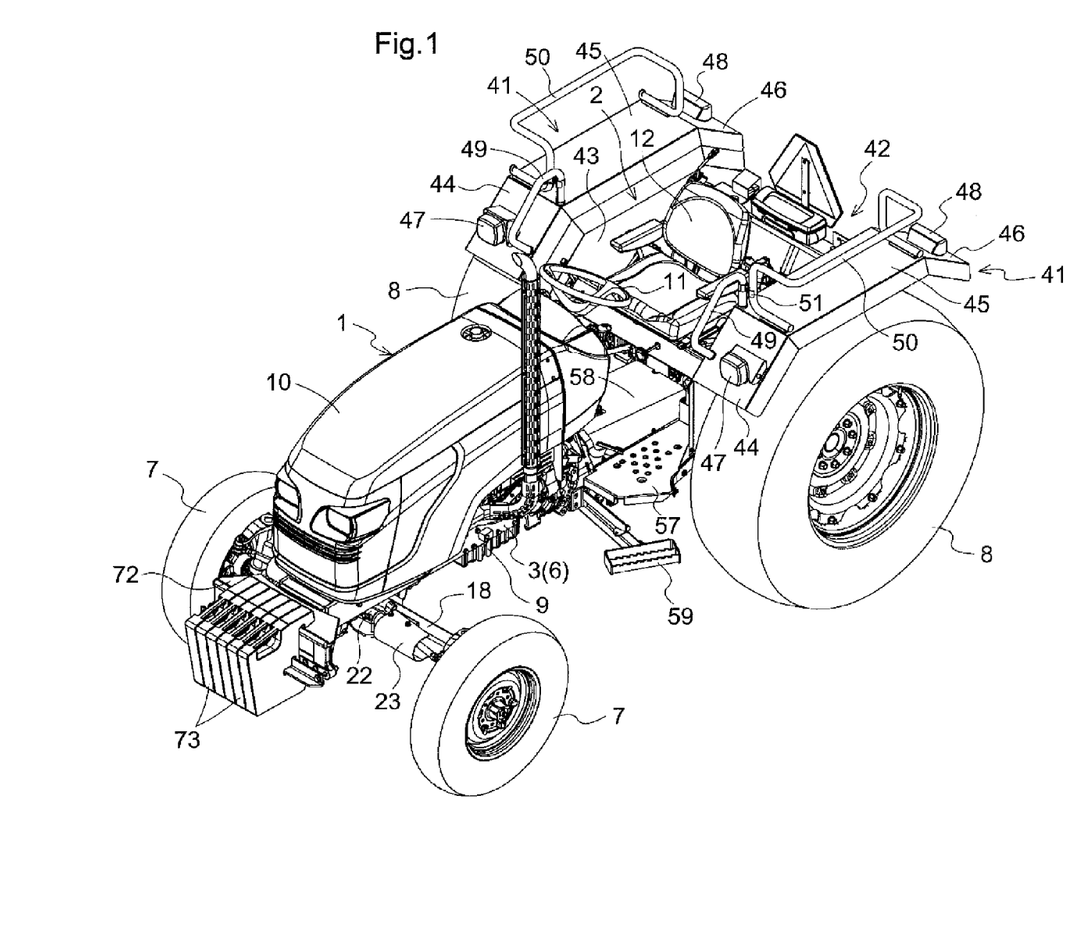
FIG. 1 is a view showing a first embodiment (applied also to subsequent drawings up to FIG. 11), which is an overall perspective view of a tractor as an example of a work vehicle.

As shown in FIG. 1, the tractor includes an engine section 1 at a vehicle body front portion, and includes also a driving section 2 at a vehicle body intermediate portion rearwardly of the engine section 1. A vehicle body frame 6 comprises an integrated connected assembly of, as recited in order from its front side, a front frame 3, a clutch housing 4 (see FIG. 6), and a transmission case 5 (see FIG. 6). And, the engine section 1 is mounted on the front frame 3, and the vehicle body frame 6 is supported by a pair of right and left front wheels 7 and a pair of right and left rear wheels 8.

The engine section 1 includes an engine 9 using a diesel engine supported on the front frame 3 with vibration isolation arrangement using a vibration isolator (not shown). A hood 10 is provided to form an engine room accommodating this engine 9. This hood 10 is vertically pivotable between a closed state forming the engine room therein and an opened state for opening the engine room to the outside. Power from the engine 9 is transmitted to the front wheels 7 and the rear wheels 8 via a traveling transmission system including e.g. a traveling speed changer (not shown) incorporated in the transmission case 5 acting also as a vehicle body frame. Further, the driving section 2 includes a steering wheel 11, a driver's seat 12, etc.

Figure 6:
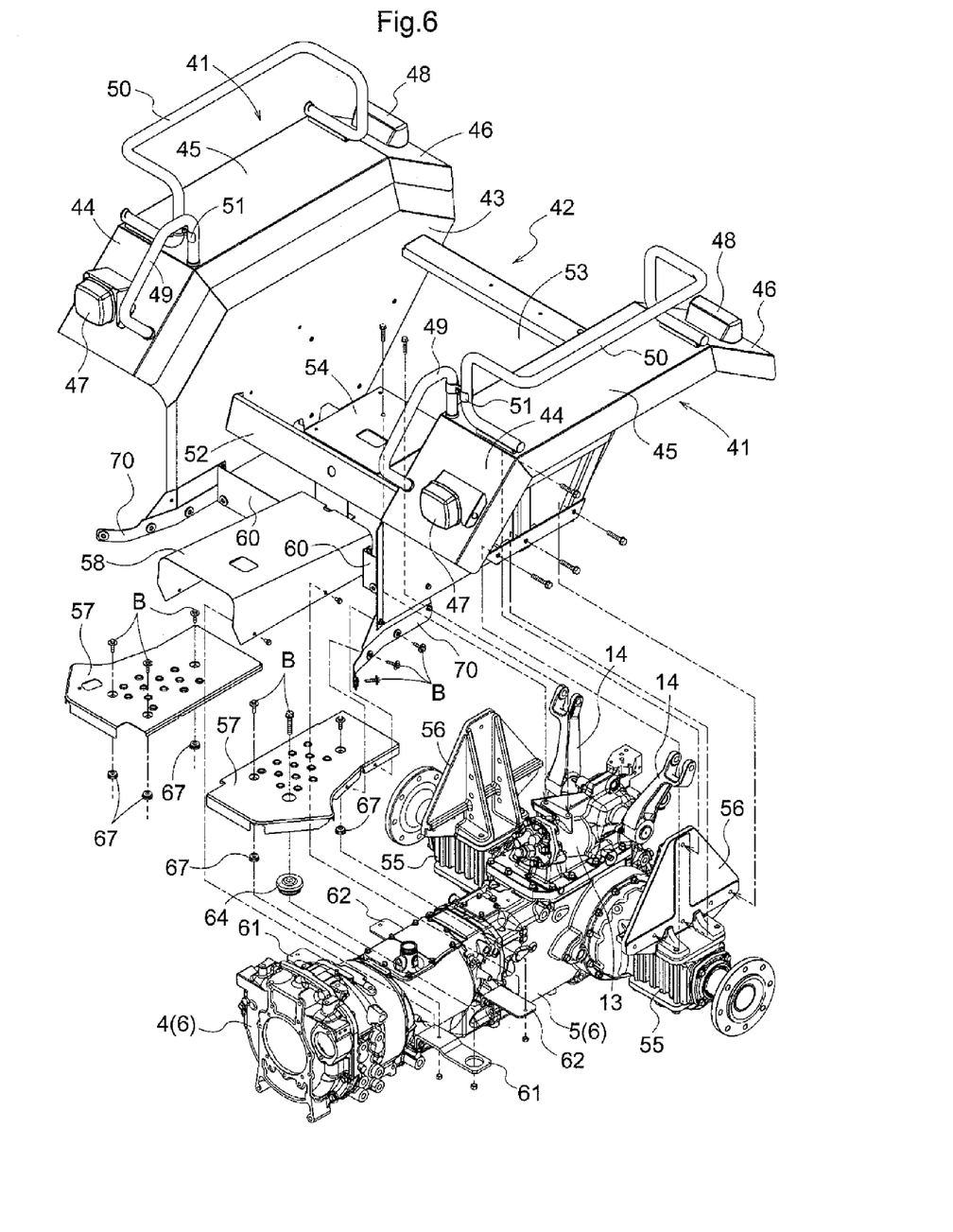
FIG. 6 is an exploded perspective view showing fenders, a floor sheet, steps, a transmission case, etc.

As shown in FIG. 6, in a rear portion of the transmission case 5, there are provided e.g. a pair of right and left lift arms 14 which are pivotally driven in the vertical direction by an operation of e.g. a hydraulic lift cylinder 13 housed at its rear upper portion, and a power take-off (PTO) shaft (not shown) which allows takeoff of the engine power to the outside. To the PTO shaft, the power from the engine 9 is transmitted via a PTO transmission system provided separately of the traveling transmission system incorporated in the transmission case 5 and consisting of such components as a PTO speed changer (not shown), a PTO clutch, etc. To the right and left lift arms 14, there is connected a link mechanism (not shown) connected to a rear portion of the transmission case 5 to be pivotally lifted up/down. To the PTO shaft, there are connected e.g. a transmission shaft for transmitting power to a utility implement (not shown) such as a rotary plow device connected to its link mechanism, etc.

(Front Frame)

Figure 2:
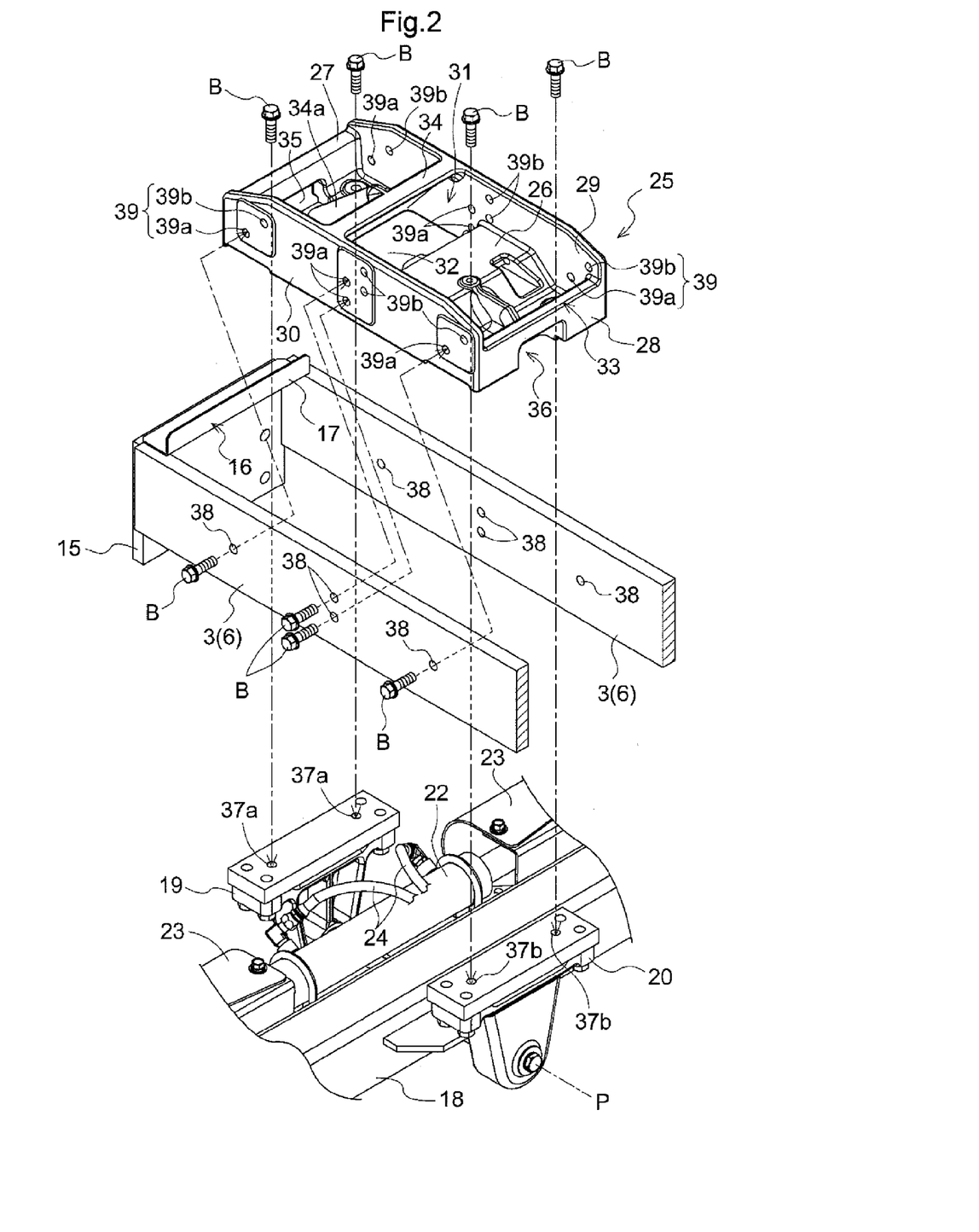
FIG. 2 is an exploded perspective view showing a front frame, a weight, a front axle case, etc.
Figure 3:
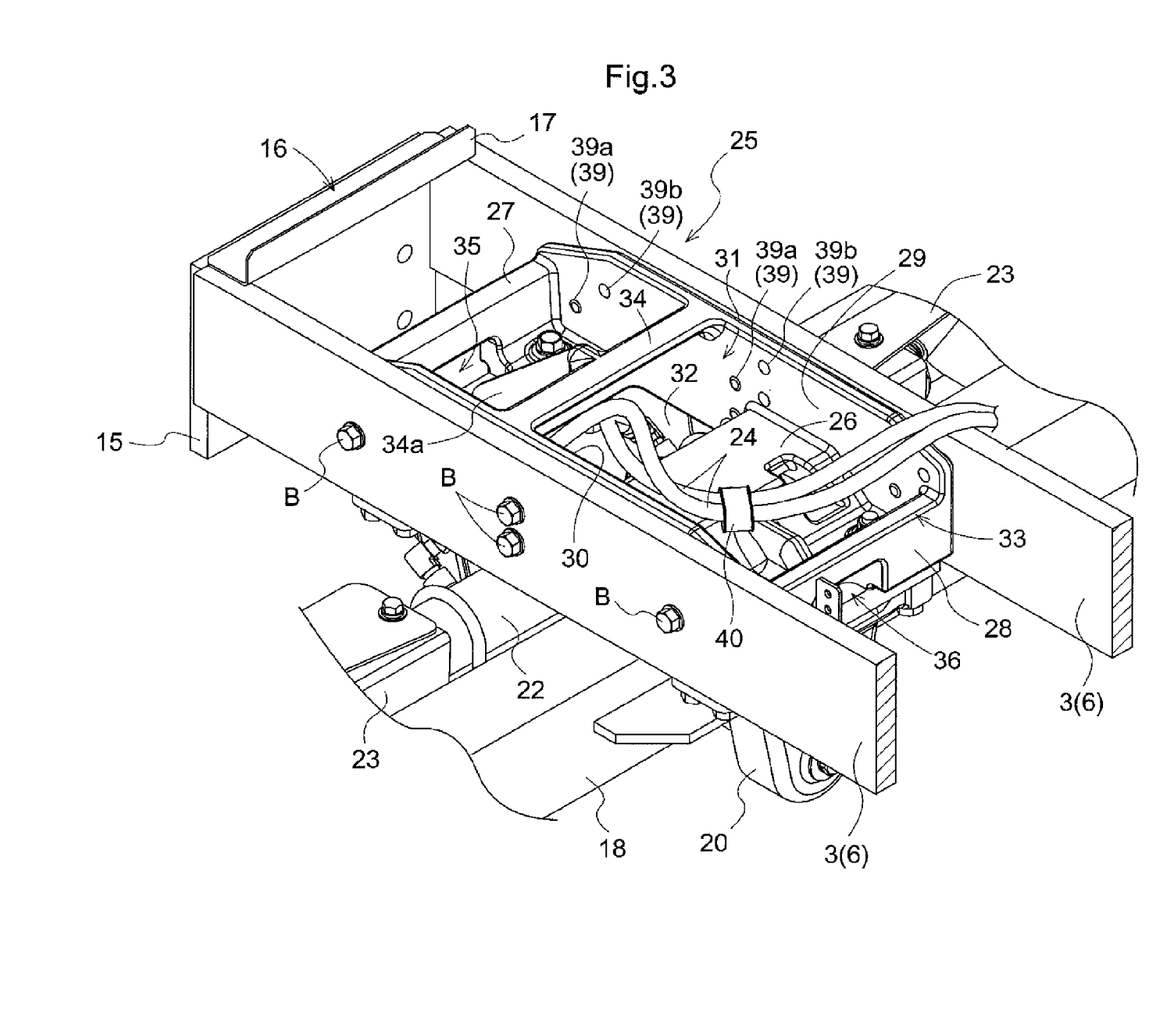
FIG. 3 is a perspective view showing the front frame, the weight, the front axle case, etc. under their assembled condition.

As shown in FIGS. 1 through 3, the vehicle body frame 6 includes, on a front side thereof, a pair of right and left front frames 3 spaced apart from each other along a vehicle body lateral width direction and extending in a vehicle body front/rear direction. Each one of the pair of right and left front frames 3 is comprised of a plate member elongate in the vertical direction, having a narrower width in the vehicle body lateral width direction and a certain (larger) width in the vertical direction. Front ends of the pair of right and left front frames 3 are connected to each other via a plate-like first connecting frame 15. The first connecting frame 15 has a width in the vehicle body lateral width direction to extend between the pair of right and left front frames 3 and is disposed to extend downwardly beyond the pair of right and left front frames 3 in the vertical direction. To front end upper portions of the pair of right and left front frames 3, too, there is provided a plate-like second connecting frame 16 interconnecting the above front end upper portions. The second connecting frame 16 is bent upwards at its intermediate portion relative to the vehicle body front/rear direction, thus forming an uprising wall portion 17 extending upwards. When the hood 10 is set to its closed state, the front lower end portion of the hood 10 is disposed forwardly of the uprising wall portion 17, so that the front lower end portion of the closed hood 10 can be received and supported by the second connecting frame 16.

As shown in FIG. 1, at the front end portions of the front frames 3, there is provided a weight supporting body 72 capable of supporting a plurality of weight members 73. The weight supporting body 72 is shaped to extend in the vertical direction as well as in the vehicle body lateral width direction, forwardly of the hood 10. By engaging an engaging portion of each weight member 73 is engaged with an engaged portion of the weight supporting body 72, the weight member 73 can be engaged with and supported by the weight supporting body 72. And, to the weight supporting body 72, the plurality of weight members 73 can be attached in juxtaposition along the vehicle body lateral width direction. Incidentally, FIG. 1 illustrates one exemplary case wherein six weight members 73 are attached.

(Front Axle Case)

Figure 4:
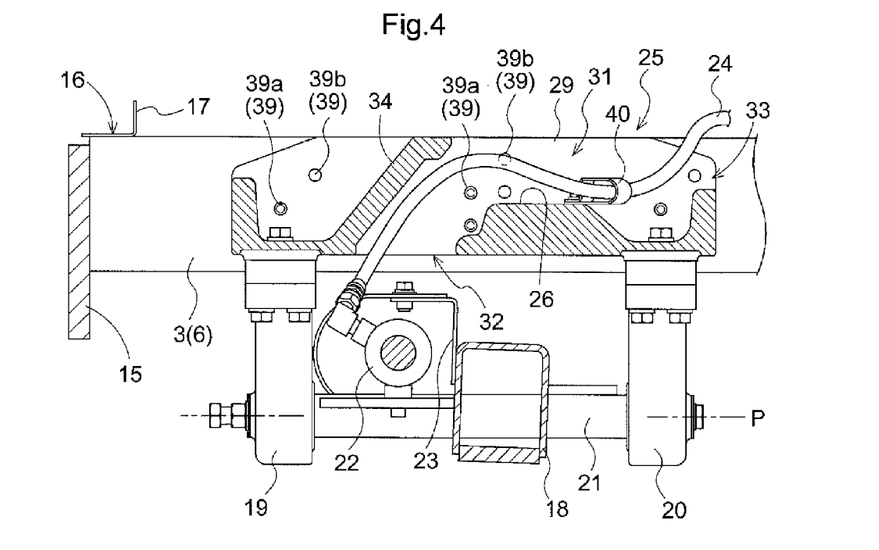
FIG. 4 is a side view in vertical section showing the front frame, the weight, the front axle case, etc. under their assembled condition.

As shown in FIGS. 2 through 4, to lower portions of the pair of right and left front frames 3, there is attached a tubular front axle case 18 interconnecting the right and left front wheels 7. On the front side of the front axle case 18, there is provided a first supporting body 19; and on the rear side of the front axle case 18, there is provided a second supporting body 20. And, the front axle case 18 is disposed along the vehicle body front/rear direction and between the first supporting body 19 and the second supporting body 20. The first supporting body 19 and the second supporting body 20 have a similar shape, with its upper end portion being formed like a flat plate extending along the vehicle body lateral width direction, and with its portion extending downwards from its upper end portion being inclined with a progressively decreasing width in the vehicle body lateral width direction towards the downward side. The first supporting body 19 and the second supporting body 20 are bolt-fastened with their upper end portions being placed in contact with lower end portions of the front frames 3, thus being connected to the lower end portions of the pair of right and left front frames 3 to extend between these pair of right and left front frames 3 in the vehicle body lateral width direction. Also, the first supporting body 19 and the second supporting body 20, via their lower ends, rotatably support a front/rear shaft portion 21 extending along the vehicle body front/rear direction, and to this front/rear shaft portion 21, the front axle case 18 is connected (see FIG. 4). In this way, the front axle case 18 is mounted to be rotatable about a front/rear axis P along the vehicle body front/rear direction by the front/rear shaft portion 21 extending between the first supporting body 19 and the second supporting body 20.

On the front side of the front axle case 18, there is provided a cylinder supporting body 23 supporting a steering cylinder 22 which extends along the vehicle body lateral width direction. The steering cylinder 22 is a hydraulic cylinder for steering the right and left front wheels 7 by an operation of the steering wheel 11. The cylinder supporting body 23 is provided in the form of a tube surrounding the circumference of the steering cylinder 22. However, the cylinder supporting body 23 does not extend along the entire length of the steering cylinder 22 in the vehicle body lateral width direction, but leaves a center portion of the steering cylinder 22 in the vehicle body lateral width direction, namely, a portion corresponding to the lower sides of the pair of right and left front frames 3, exposed to the outside. And, to the exposed portion of the steering cylinder 22, there is connected a hydraulic hose (an example of "extension member") 24 interconnecting the steering cylinder 22 and a controller of a power steering device.

(Weight)

As shown in FIGS. 2 through 4, a weight 25 is attached to the front frames 3. The weight 25 is disposed at a position overlapped with the front axle case 18 in the vehicle body front/rear direction. The weight 25 has a greater width than the front axle case 18 in the vehicle body front/rear direction. The weight 25 has a width extending between the first supporting body 19 and the second supporting body 20 in the vehicle body front/rear direction. The weight 25 includes: a bottom portion 26 having a width corresponding to the distance between the pair of right and left front frames 3 in the vehicle body lateral width direction; a front wall portion 27 extending upward from the front end portion of the bottom portion 27; a rear wall portion 28 extending upward from the rear end portion of the bottom portion 26; a right wall portion 29 extending upward from the right end portion of the bottom portion 26; and a left wall portion 30 extending upward from the left end portion of the bottom portion 26. The weight 25 is provided in the form of a bottomed box forming an inner space 31 having an opened top and surrounded on its front, rear, right and left sides by the front wall portion 27, the rear wall portion 28, the right wall portion 29 and the left wall portion 30, respectively. The bottom portion 26 forms a first communicating portion 32 which communicates the inner space 31 with the outside of this inner space 21 (more particularly, a lower outer portion of the inner space 31); and as the upper end portion of the rear wall portion 28 is formed lower than the upper end portions of the right wall portion 29 and the left wall portion 30, there is formed a second communicating portion 33 which communicates the inner space 31 with the outside of this inner space 31 (more particularly, an upper side rear outer portion of the inner space 31). At an intermediate portion of the weight 25 in the vehicle body front/rear direction, there is provided a connecting portion 34 which extends upward from a position forwardly adjacent the first communicating portion 32 of the bottom portion 26, thus bridging the right wall portion 29 and the left wall portion 30. The connecting portion 34 has an inclined shape with its upper portion being positioned more rearwards and is configured to cover the upper side of the first communicating portion 32 (see FIG. 4). With this, the inner space 31 is divided by the connecting portion 34 into the front side and the rear side in the vehicle body front/rear direction. A first discharge opening 35 for discharging an amount of retained water if any retained in the front side inner space 31 is formed at the center portion of the front wall portion 27 in the vehicle body lateral width direction. A second discharge opening 36 for discharging an amount of retained water if any retained in the rear side inner space 31 is formed at the center portion of the rear wall portion 28 in the vehicle body lateral width direction. The bottom portion 26 inside the rear side inner space 31 has a shape whose front side portion bulges more upwards than its rear side portion. In the connecting portion 34, there is formed a projecting portion 34a which projects to the front side at the center portion in the vehicle body lateral width direction for the sake of reinforcement.

As the weight 25 is provided between the first supporting body 19 and the second supporting body 20 in the vehicle body front/rear direction, the weight 25 is disposed upwardly of the steering cylinder 22. In disposing the length of the hydraulic hose 24 along the vehicle body front/rear direction, this disposing is done with utilization of the weight 25. The hydraulic hose 24 is extended through the first communicating portion 32 from the outside (lower outer side) of the weight 25 into the inner space 31, and is also extended through the second communicating portion 33 from the outside (upper side rear outer portion) of the weight 25. In this way, the hydraulic hose 24 is arranged to extend from the front side to the rear side via the weight 25. At the center portion of the bottom portion 26 in the vehicle body lateral width direction in the rear side inner space 31, there is provided a band member 40 that surrounds the hydraulic hose 24 to support this hose 24.

(Connection of Weight)

The weight 25 has its front end portion connected to the first supporting body 19 and has its rear end portion connected to the second supporting body 20. Regarding the front end portion of the weight 25, a bolt B is inserted to a front insertion hole portion formed in this front end portion of the weight 25 and a first hole portion 37a formed at the upper end portion of the first supporting body 19 and then fastened, whereby the front end portion of the weight 25, via the two portions thereof spaced apart in the vehicle body lateral width direction, is connected to the first supporting body 19. Regarding the rear end portion of the weight 25, too, a bolt B is inserted to a rear insertion hole portion formed at the rear end portion of the weight 25 and a second hole portion 27b formed at the upper end portion of the second supporting body 20 and then fastened, whereby the rear end portion of the weight 25, via the two portions thereof spaced apart in the vehicle body lateral width direction, is connected to the second supporting body 20. Regarding connection between the weight 25 and the front frame 3, a bolt B is inserted to a frame side hole portion 38 formed in the front frame 3 and weight side hole portions 39 formed in the right wall portion 29 and the left wall portion 30 of the weight 25 and then fastened thereto, whereby the weight 25, via the three positions of the front end portion, the intermediate portion and the rear end portion spaced apart in the vehicle body front/rear direction and the two positions spaced apart vertically in the intermediate portion, is connected to the pair of right and left front frames 3, respectively.

Figure 5:
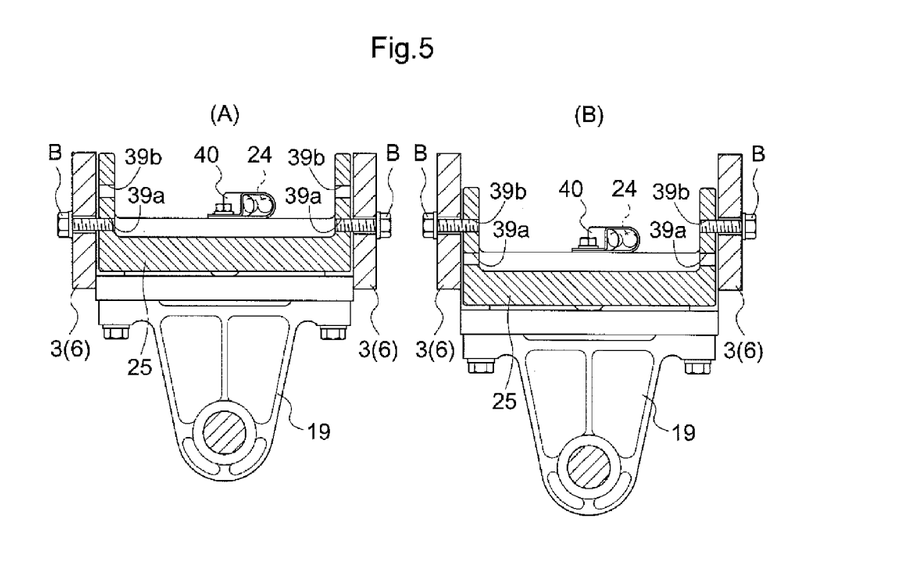
FIG. 5 is a front view in vertical section showing the front frame, the weight, the front axle case, etc. under their assembled condition.

As the weight side hole portions 39, there are provided two kinds, i.e. a first weight side hole portion 39*a* for use in attaching the weight 25 to a first position (see (A) in FIG. 5) relative to the front frames 3 in the vertical direction and a second weight side hole portion 39*b* for use in attaching the weight 25 to a second position (see (B) in FIG. 5) which is lower than the first position relative to the front frames 3 in the vertical direction. The first weight side hole portion 39*a* and the second weight side hole portion 38*b* are provided adjacent to each other in the vehicle body front/rear direction, with the first weight side hole portion 39*a* being located on the front side. Incidentally, in case the tractor is a two-wheel drive type, the weight 25 will be attached to the first position, as shown in (A) in FIG. 5. Whereas, in case the tractor is a four-wheel drive type, the weight 25 will be attached to the second position, as shown in (B) in FIG. 5. FIGS. 2 through 4 show the case in which the weight 25 is attached to the first position.

In this way, the weight 25 can be freely attached to be engaged between the pair of right and left front frames 3 in the vehicle body lateral width direction. And, under the attached state, the upper end portion of the weight 25 is disposed vertically upwardly of the lower end portion of the front frames 3 and also at a same position of the upper end portions of the front frames 3, over the entire length in the vehicle body front/rear direction. With this arrangement, the weight 25 is contained between the pair of right and left front frames 3 in the vehicle body lateral width direction and also within the vertical width of the pair of right and left front frames 3 in the vertical direction. Whereby, the weight 25 can be attached through effective utilization of the space available between the pair of right and left front frames 3, and thus with reduction of disposing space.

Under the attached state, the lower end portion of the weight 25 is disposed upwardly of the lower end portions of the front frames 3 in the vertical direction. Alternatively, however, the lower end portion of the weight 25 can be disposed at the same position of the lower end portions of the front frames 3 in the vertical direction.

Further, regarding the upper end portion of the weight 25, too, the attachment can be made such that this upper end portion is disposed downwardly of the upper end portions of the front frames 3.

(Fender)

As shown in FIG. 6, there are provided a pair of right and left fenders 41 that cover the right and left rear wheels 8; and between the pair of right and left fenders 41, a floor sheet 42 is provided. And, upwardly of this floor sheet 42, the driver's seat 12 is provided. Each one of the pair of right and left fenders 41 includes an uprising wall portion 43 extending vertically on the inner side of the rear wheel 8 in the vehicle body lateral width direction, and a first extension portion 44, a second extension portion 45 and a third extension portion 46 which extend outwards from the upper end portion of the uprising wall portion 43 in the vehicle body lateral width direction. From the front side in the vehicle body front/rear direction, the first extension portion 44, the second extension portion 45 and the third extension portion 46 are provided continuously in this mentioned order. All of these extension portions 44, 45, 46 have a shape extending along the vehicle body front/rear direction. The uprising wall portion 43 has an inclined shape with its upper portion being inclined to the outer side in the vehicle body lateral width direction. The first extension portion 44 has an inclined shape with its front side portion being disposed progressively on the lower side and includes a front side ramp 47 at its intermediate portion in the vehicle body front/rear direction. The second extension portion 45 is formed flat to extend in the horizontal direction along its entire length in the vehicle body front/rear direction. The third extension portion 46 has an inclined shape with its rear side portion being disposed progressively on the lower side and includes a rear side ramp 48 at its intermediate portion in the vehicle body front/rear direction.

Each one of the pair of right and left fenders 41 also includes a first guard body 49 and a second guard body 50 so as to surround the driver's seat 12 in the vehicle body lateral width direction. The first guard body 49 is formed by bending a bar-like member and is configured to extend between an intermediate portion of the first extension portion 44 and a front end portion of the second extension portion 45 in the vehicle body front/rear direction. The first guard body 49 is provided at the inner end portions of the first extension portion 44 and the second extension portion 45 in the vehicle body lateral width direction. The first guard body 49 is configured such that its front end portion and rear end portion extend upward and its intermediate portion bridging between the front end portion and the rear end portion is located upwardly of the first extension portion 44 and is bent along the inclination of the first extension portion 44 to extend along the vehicle body front/rear direction. The second guard body 50 is formed by bending a bar-like member and is configured to extend between the front end portion, the outer end portion and the rear end portion of the second extension portion 45 in the vehicle body lateral width direction. The second guard body 50 is configured such that its front end portion and rear end portion extend from the outer side to the inner side in the vehicle body lateral width direction and is bent upwards to extend upwards and then disposed upwardly of the second extension portion 45 to extend from the inner side to the outer side in the vehicle body lateral width direction, and its intermediate portion bridging between the front end portion and the rear end portion is disposed upwardly of the second extension portion 45 to extend along the vehicle body front/rear direction. In this way, the second guard body 50 is shaped to surround the front end portion, the outer end portion and the rear end portion of the second extension portion 45, while opening the upper side of this portion 45 to the outside. Further, the first guard body 49 and the second guard body 50 are provided continuously with each other in the vehicle body front/rear direction, and a connection member 51 is provided for connecting the rear end portion of the first guard body 49 with the front end portion of the second guard body 50.

The floor sheet 42 includes a first floor sheet 52 in the form of a plate extending in the vertical direction and connected to the front sides of the pair of right and left fenders 41, a second floor sheet 53 in the form of a plate extending in the vertical direction and connected to the rear sides of the pair of right and left fenders 41, and a third floor sheet 54 in the form of a plate extending in the vehicle body front/rear direction and connected to the first floor sheet 52 and the second floor sheet 53. The second floor sheet 53 has an inclined shape with its upside portion being disposed progressively rearwards. In the vehicle body lateral width direction, gaps are formed between the pair of right and left fenders 41 and the opposed ends of the third floor sheet 54 respectively, so that when the floor sheet 42 is to be connected to the upper portion of the transmission case 5, a pair of right and left first connecting bodies 56 provided in a rear axle case 55 can be fitted in these respective gaps.

(Steps)

As shown in FIG. 6, on the front sides of the pair of right and left fenders 41 and on opposed lateral sides of the transmission case 5, there are provided a pair of right and left steps 57. Each one of the pair of right and left steps 57 is formed of a plate-like member whose end portions in the vehicle body front/rear direction and in the vehicle body lateral width direction are bent downwards. Between the pair of right and left steps 57, a center step 58 is provided. And, this center step 58 is configured to cover the upper side of the transmission case 5. The center step 58 is formed of a plate-like member whose opposed end portions in the vehicle body lateral width direction are bent downwards. Further, as shown in FIG. 1, on the left side of the vehicle body and forwardly of the steps 57, there is provided an auxiliary step 59 extending to the outer side from the vehicle body frame 6.

(Connection of Fenders, Floor Sheet and Steps)

As shown in FIG. 6, the pair of right and left fenders 41 are connected to each other via the floor sheet 42. The center step 58 too is connected to the pair of right and left fenders 41 via a pair of right and left step connecting members 60. Each one of the step connecting members 60 extends to the outer side in the vehicle body lateral width direction from the rear end portion of the center step 58 and its extension end portion is connected to the front end portion of the fender 41. In this way, the pair of right and left fenders 41, the floor sheet 42 and the center step 58 are integrated into one integral body. The pair of right and left steps 57 are provided separately from the integral body of the pair of right and left fenders 41, the floor sheet 42 and the center step 58.

Figure 8:
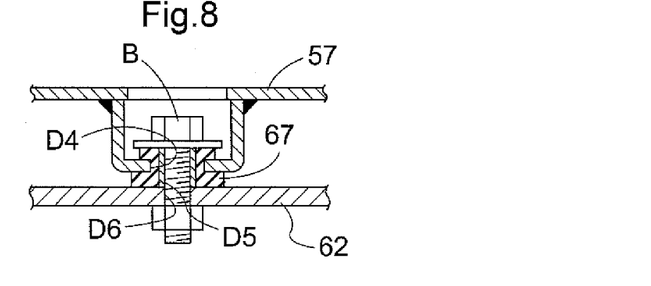
FIG. 8 is a section view showing connection between the steps and a second support stay.
Figure 9:
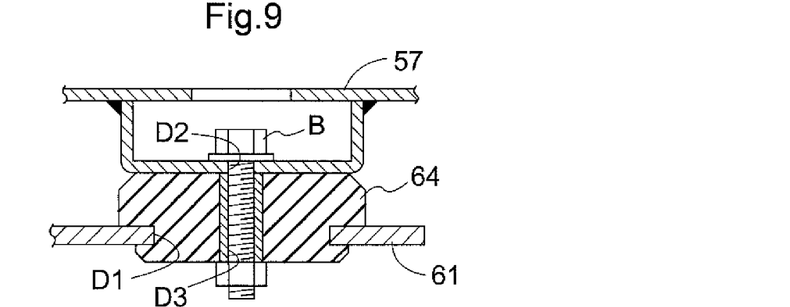
FIG. 9 is a section view showing connection between the steps and a first support stay.

Each one of the pair of right and left steps 57 is connected to and supported by a first support stay 61 and a second support stay 62 which extend to the outer side from the lateral side portion of the transmission case 5 in the vehicle body lateral width direction. The first support stay 61 connects and supports the front end sides of the pair of right and left steps 57. As shown in FIG. 9, in the left step 57, a round-shaped first elastic member 64 is fitted in a first attaching hole portion D1 formed in the first support stay 61, with the first elastic member 64 having a larger diameter than the first attaching hole portion D1. A bolt B is inserted to a second attaching hole portion D2 formed in the step 57 and a third attaching hole portion D3 formed in the third elastic member 64 and fastened thereto. The first support stay 61 supports the front end side of the left step 57, with the first elastic member 64 being interposed between this first support stay 61 and the left step 57. The second support stay 62 connects and supports the rear end sides of the pair of right and left steps 57. As shown in FIG. 8, with a round-shaped second elastic member 67 being placed on the second support stay 62, the round-shaped second elastic member 67 is fitted in a fourth attaching hole portion D4 formed in the step 57, with the second elastic member 67 having a larger diameter than the fourth attaching hole portion D4. A bolt B is inserted to a fifth attaching hole portion D5 formed in the second elastic member 67 and a sixth attaching hole portion D6 formed in the second support stay 62 and fastened thereto. The second support stay 62 supports the rear end sides of the steps 57, with the second elastic member 67 being interposed between the second support stay 62 and the steps 57. Incidentally, regarding the front end side of the right step 57, like the second support stay 62, this front end side is supported by the first support stay 61 via the second elastic member 67. In the manner described above, the pair of right and left steps 57 are supported with vibration isolation arrangement provided by the first elastic member 64 and the second elastic member 67.

Figure 7:
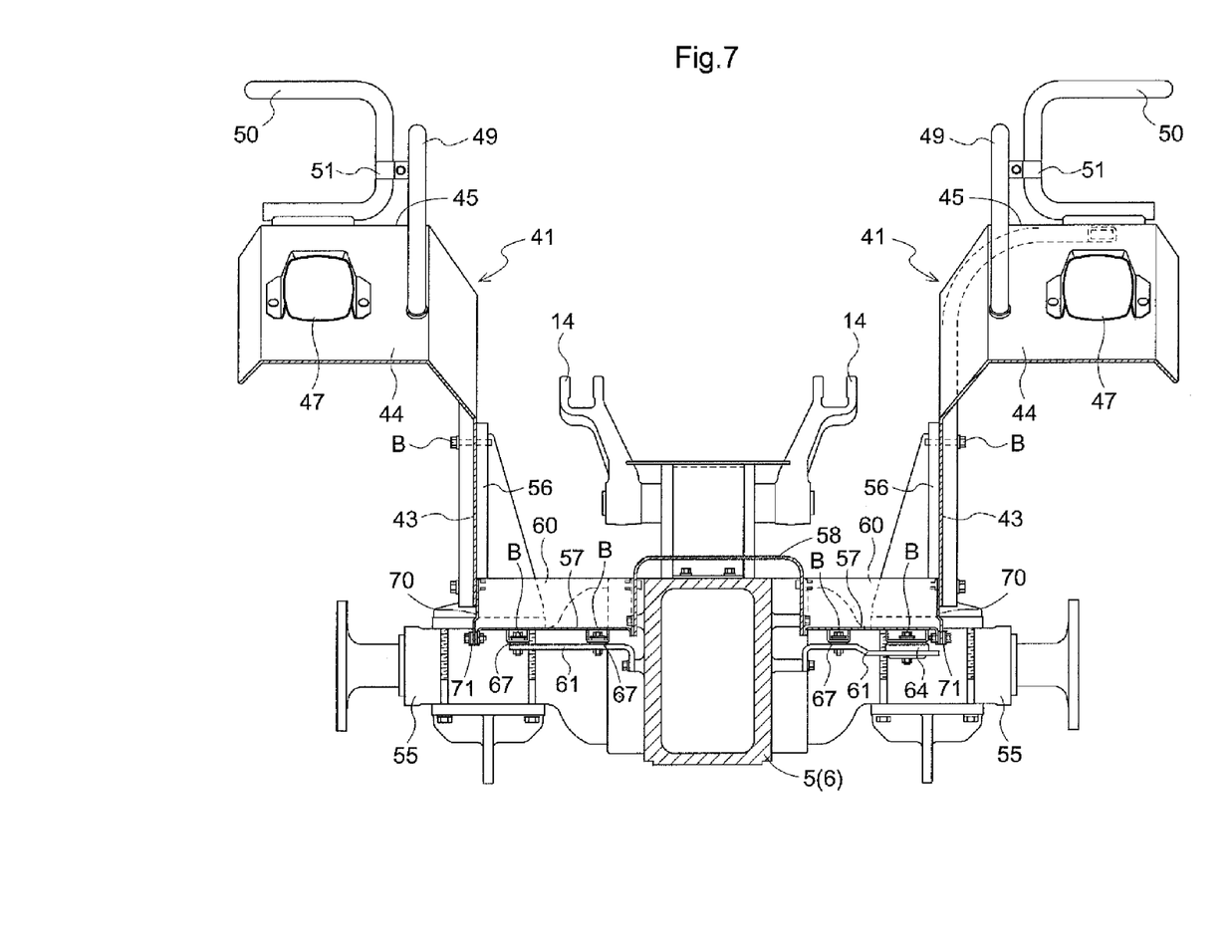
FIG. 7 is a front view in vertical section showing the fenders the floor sheet, the steps, the transmission case, etc. under their assembled condition.
Figure 11:
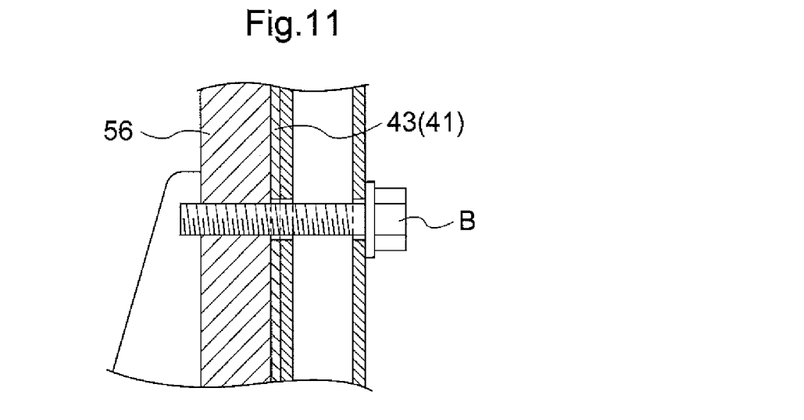
FIG. 11 is a section view showing connection between the fenders and the transmission case.

As described above, the pair of right and left fenders 41, the floor sheet 42 and the center step 58 are configured as an integral body. Thus, as such integral body, the fenders 41, the floor sheet 42 and the center step 58 are connected respectively to the desired positions. Regarding connection of the fenders 41, as described above, as a gap is formed between the third floor sheet 54 and the fenders 41, the integral body of the pair of right and left fenders 41, the floor sheet 42 and the center step 58 is displaced downwards to allow insertion of the first connecting bodies 56 into the gap. With this, as shown in FIG. 7 and FIG. 11, the first connecting bodies 56 are disposed at positions opposed to or contacted with the uprising wall portions 43 of the fenders 41, thus connecting the uprising wall portions 43 of the fenders 41 to the first connecting bodies 56 with the bolts B. Regarding connection of the floor sheet 42, the third floor sheet 54 of the floor sheet 42 is bolt-connected to the upper portion of the transmission case 5. Regarding connection of the center step 58, the opposed end portions of the center step 58 in the vehicle body lateral width direction are connected to the lateral side portion of the transmission case 5 with bolts. In this way, regarding the integral body of the pair of right and left fenders 41, the floor sheet 42 and the center step 58, unlike the pair of right and left steps 57, the connection of this integral body is made directly to the lateral side portion of the transmission case 5, the upper portion of the transmission case 5 and the first connecting bodies 56, without any elastic members being interposed therebetween.

Figure 10:
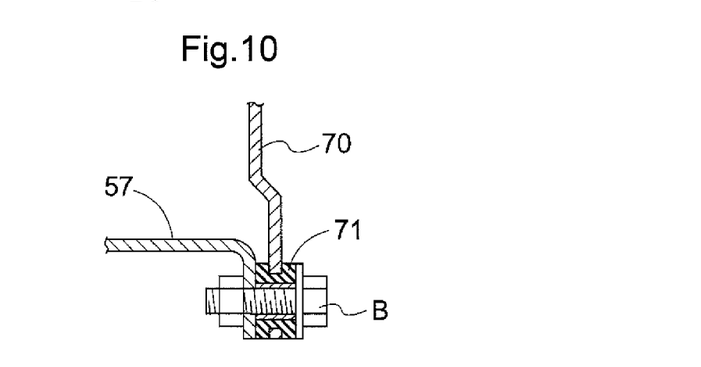
FIG. 10 is a section view showing connection between the steps and the fenders.

Regarding the connection between the integral body of the pair of right and left fenders 41, the floor sheet 42 and the center step 58, and the pair of right and left steps 57, as shown in FIG. 6 and FIG. 7, a third connecting frame 70 provided to extend from the front end portions of the fenders 41 to the front side and the outer end portions of the steps 57 in the vehicle body lateral width direction are connected to each other. As shown in FIG. 10, the steps 57 and the third connecting frame 70 are connected with third elastic members 71 being interposed therebetween, and being fastened by bolts B, thus preventing transmission of vibration between the steps 57 and the integral body of the pair of right and left fenders 41, the floor sheet 42 and the center step 58.

Second Embodiment

This second embodiment is an embodiment differing from the above-described first embodiment, in the respect of attachment of the weight 25. The rest of the construction is identical to the above-described first embodiment. In the first embodiment, the weight 25 is attached to the front frames 3 constituting the vehicle body frame 6. Whereas, in this second embodiment, as shown in FIG. 12, a weight 74 is attached to the transmission case 5 constituting the vehicle body frame 6.

Figure 12:
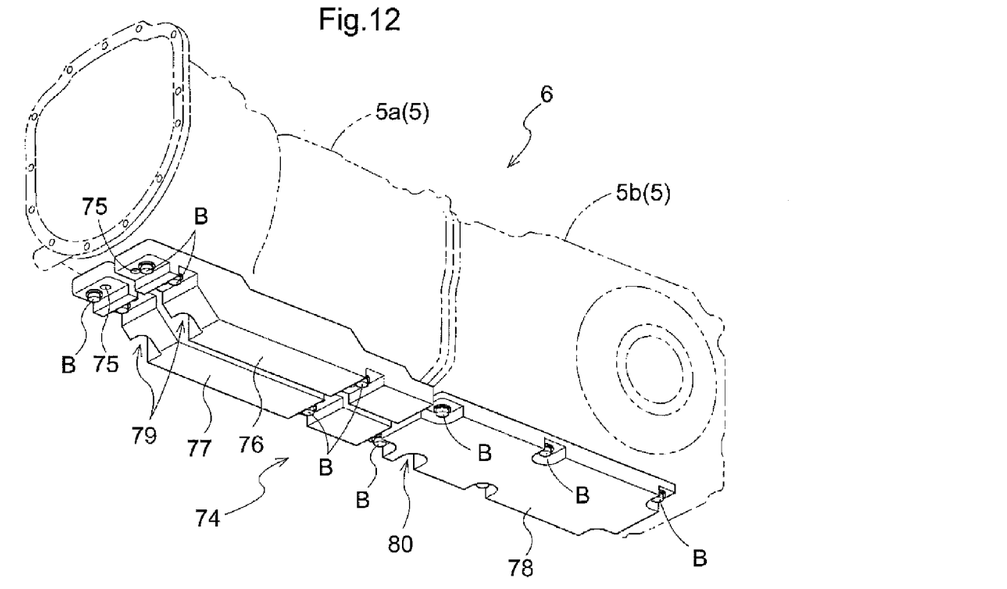
FIG. 12 is a view showing a second embodiment (applied also to subsequent drawings up to FIG. 14), which is a perspective view showing a transmission case and a weight.
Figure 13:
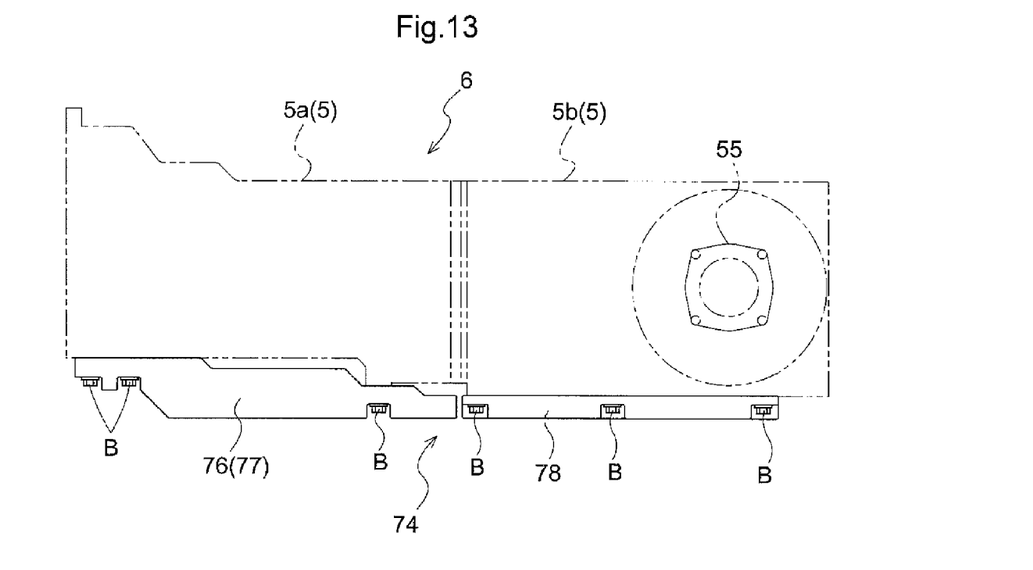
FIG. 13 is a side view showing the transmission case and the weight.
Figure 14:
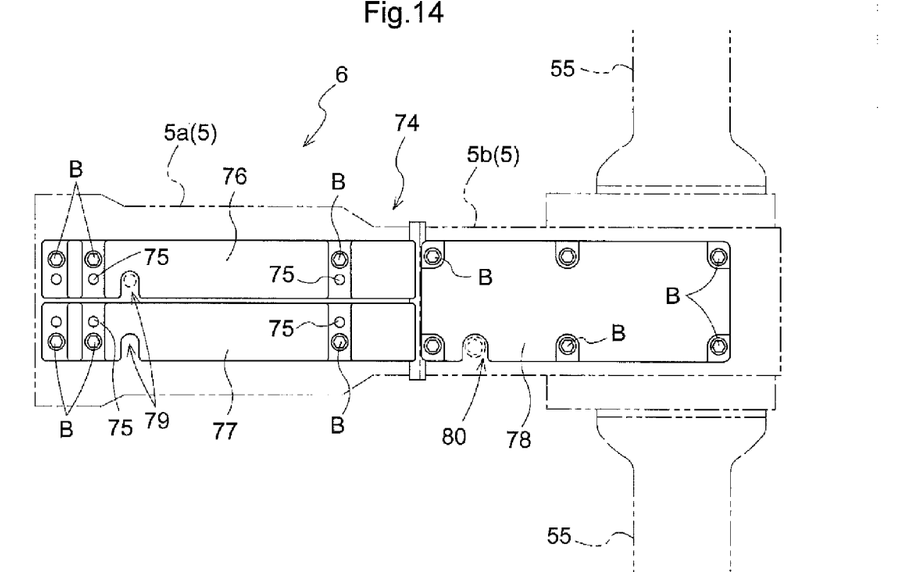
FIG. 14 is a bottom view showing the transmission case and the weight.

As shown in FIGS. 12 through 14, the weight 74 is configured to be attachable, with its upper end portion being placed in contact with the lower end portion of the transmission case 5. In the lower end portion of the transmission case 5, there are formed fastening hole portions in which the bolts B are to be fastened. The bolts B are inserted and fastened in/to weight side attaching hole portions 75 and fastening hole portions formed in the transmission case 5.

The weight 74 is configured to be dividable into a plurality of separate members. In this second embodiment, the weight 74 is divided into three separate members, i.e. a first separate member 76, a second separate member 77 and a third separate member 78. The first separate member 76 and the second separate member 77 are provided in the form of plates extending in the vehicle body front/rear direction and are attachable to the lower end portion of the transmission case 5, adjacently in juxtaposition with each other along the vehicle body lateral width direction. The first separate member 76 and the second separate member 77 have a same shape so that these members 76, 77 can be attached to either the right side or the left side in the vehicle body lateral width direction. The weight side attaching hole portions 75 are provided in a plurality of sets, with one set of a pair of right and left ones being provided for the right side and the left side in juxtaposition in the vehicle body lateral width direction. Further, each one of the first separate member 76 and the second separate member 77 includes a first cutout portion 79 in order to avoid interference by e.g. a boss portion provided in the lower end portion of the transmission case 5. The third separate member 78 is configured to be attachable to a position rearwardly adjacent the first separate member 76 and the second separate member 77. The third separate member 78 is provided in the form of a plate extending in the vehicle body front/rear direction and has a width in the vehicle body lateral width direction, which width is approximately equal to a combined width of the first separate member 76 and the second separate member 77. In the third separate member 78, a second cutout portion 80 is formed in order to avoid interference with e.g. a drain plug provided in the lower end portion of the transmission case 5.

The transmission case 5 is configured to be dividable into a front case portion 5a and a rear case portion 5b. To the lower end portion of the front case portion 5a, the first separate member 76 and the second separate member 77 are attached. To the lower end portion of the rear case portion 5b, the third separate member 78 is attached. When the first separate member 76, the second separate member 77 and the third separate member 78 are attached, the respective lower end portions of the first separate member 76, the second separate member 77 and the third separate member 78 are disposed at a same position in the vertical direction.

With the above-described arrangement, the lower end portion of the weight 74 is provided in the form of a flat face over the entire length in the vehicle body front/rear direction, and the upper end portion of the weight 74 is disposed at the same position as the lower end portion of the transmission case 5 constituting the vehicle body frame 6. Further, the upper end portion of the weight 74 is disposed downwardly of the upper end portion of the transmission case 5 constituting the vehicle body frame 6.

Incidentally, for instance, in an alternative arrangement, a recessed portion may be formed in the lower face of the transmission case 5, such that when the weight 74 is attached to the transmission case 5, the upper end portion of the weight 74 may be disposed upwardly of the lower end portion of the transmission case 5.

Figure 15:
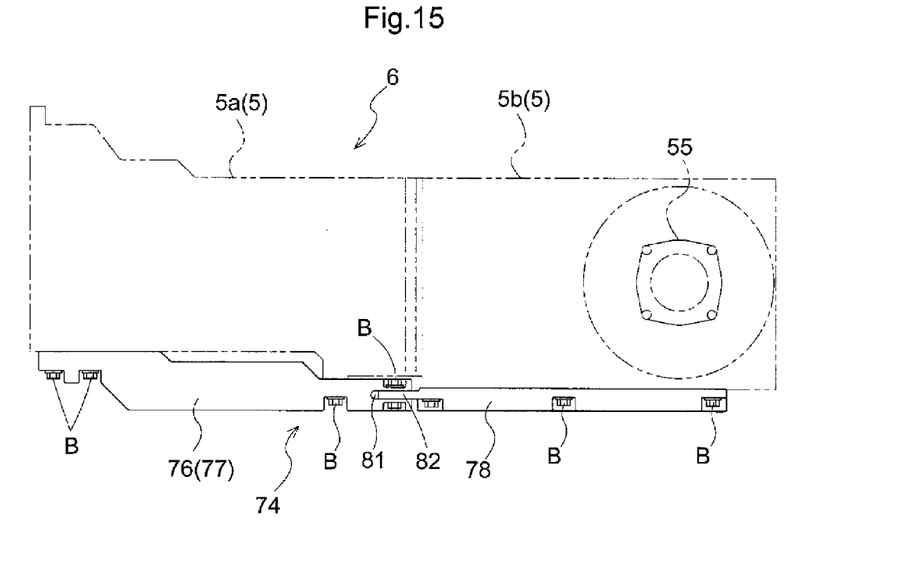
FIG. 15 is a side view showing a transmission case and a weight according to a further embodiment (1).

Other Embodiments (1) In the second embodiment described above, as shown in FIG. 15, a recessed portion 81 recessed to the front side may be provided at the rear end portions of the first separate member 76 and the second separate member 77, and at the front end portion of the third separate member 78, there may be provided a narrow projecting portion 82 which can be inserted to or removed from the recessed portion 81. With this, with bolt-fastening with the projecting portion 82 being inserted in the recessed portion 81, the first separate member 76, the second separate member 77 and the third separate member 78 may be provided integrally in the vehicle body front/rear direction. With this, attachment of the weight 74 is made possible with providing reinforcement at the dividing portion between the front case portion 5a and the rear case portion 5b in the transmission case 5.

(2) In the first embodiment described above, the shape, etc. of the weight 25 can vary in many ways as desired. For instance, the inner space 31, the first communicating portion 32 and the second communicating portion 33 can be omitted and a weight object can be charged also into the spaces occupied thereby. Further, in the case of charging weight object in the inside as described above, the discharge openings 35, 36 for discharging retained water retained in the inner space 31 to the outside can be omitted.

(3) In the first embodiment described above, the component which is to be arranged to extend in the vehicle body front/rear direction with effective utilization of the inner space 31 of the weight 25 is not limited to the hydraulic hose 24. Instead, any other extension member can be arranged.

(4) In the foregoing embodiments, the work vehicle is not limited to a tractor. The work vehicle can also be a riding grass mower, a riding rice planter, a wheeled loader, etc.

INDUSTRIAL APPLICABILITY

The present invention is applicable to a variety of work vehicles configured such that a weight is attached to a vehicle body frame and this attachment of weight to the vehicle body frame is done with minimizing a projecting amount of the weight downwards from the lower end portion of the vehicle body frame and without forming any gap which may allow intrusion of a foreign substance such as soil, mud or the like relative to the vehicle body frame and without projecting upwards from the upper end portion of the vehicle body frame.

| Description of Reference Marks/Numerals | |
|---|---|
| 3 | front frames |
| 5 | transmission case |
| 6 | vehicle body frame |
| 18 | front axle case |
| 24 | hydraulic hose (extension member) |
| 25 | weight |
| 31 | inner space |
| 32 | first communicating portion |
| 33 | second communicating portion |
| 35 | first discharge opening (discharge opening) |
| 36 | second discharge opening (discharge opening) |
| 74 | weight |

-continued

| | Description of Reference Marks/Numerals |
|---|---|
| 76 | first separate member (separate member) |
| 77 | second separate member (separate member) |
| 78 | third separate member (separate member) |

What is claimed is:

1. A work vehicle comprising:
a vehicle body having a vehicle body frame; and
a weight that can be attached to the vehicle body frame;
wherein when the weight is attached to a length of the vehicle body frame, an upper end portion of the weight is disposed in a same position as or upwardly of a lower end portion of the vehicle body frame, and at the same time in a same position as or downwardly of an upper end portion of the vehicle body frame; and wherein:
the weight includes an inner space formed inside thereof, and a first communicating portion and a second communicating portion which communicate the inner space with an outside of the weight; and
there is provided an extension member disposed to extend in the vehicle body front/rear direction via the weight, the extension member being extended via the first communicating portion from the outside of the weight into the inner space and extended via the second communicating portion from the inner space of the weight to the outside.

2. The work vehicle according to claim 1, wherein:
a front axle case is connected to a front side of the vehicle body frame; and
the weight is disposed at a position overlapped with the front axle case in the vehicle body front/rear direction.

3. The work vehicle according to claim 2, wherein:
the vehicle body frame includes a pair of right and left front frames spaced apart from each other along a vehicle body lateral width direction and extending in the vehicle body front/rear direction;
the front axle case is connected to the front frames; and
the weight is attached to be engaged between the pair of right and left front frames in the vehicle body lateral width direction.

4. The work vehicle according to claim 1, wherein the weight includes a discharge opening for discharging retained water retained in its inner space to the outside.

5. The work vehicle according to claim 1, wherein the weight is configured to be attachable with its upper end portion being placed in contact with a lower end portion of a transmission case constituting the vehicle body frame.

6. The work vehicle according to claim 1, wherein the weight is dividable into a plurality of separate members, and when the plurality of separate members are attached, lower end portions of the respective separate members are disposed at a same position in the vertical direction.

7. A work vehicle comprising:
a pair of right and left front frames which constitute a vehicle body frame and which are spaced apart from each other in a vehicle body lateral width direction and extend in a vehicle body front/rear direction; and
a weight that can be attached to the front frames;
wherein when the weight is attached to the front frames, an upper end portion of the weight is disposed in a same position as or downwardly of an upper end portion of the front frames in a vertical direction of the front frames; and wherein:
the weight includes an inner space formed inside thereof, and a first communicating portion and a second communicating portion which communicate the inner space with an outside of the weight; and
there is provided an extension member disposed to extend in the vehicle body front/rear direction via the weight, the extension member being extended via the first communicating portion from the outside of the weight into the inner space and extended via the second communicating portion from the inner space of the weight to the outside.

8. The work vehicle according to claim 7, wherein when the weight is attached to the front frames, the lower end portion of the weight is disposed in a same position as or upwardly of lower end portions of the front frames in the vertical direction of the front frames.

9. The work vehicle according to claim 7, wherein:
a front axle case is connected to a front side of the vehicle body frame; and
the weight is disposed at a position overlapped with the front axle case in the vehicle body front/rear direction.

10. The work vehicle according to claim 9, wherein:
the front axle case is connected to the front frames; and
the weight is attached to be engaged between the pair of right and left front frames in the vehicle body lateral width direction.

11. The work vehicle according to claim 7, wherein the weight includes a discharge opening for discharging retained water retained in its inner space to the outside.

12. A work vehicle comprising:
a transmission case constituting a vehicle body frame; and
a weight that can be attached to the transmission case;
wherein when the weight is attached to the transmission case, an upper end portion of the weight is disposed in a same position as or upwardly of a lower end portion of the transmission case in a vertical direction of the transmission case; and
wherein the weight is configured to be attachable with its upper end portion being placed in contact with a lower end portion of the transmission case constituting the vehicle body frame.

13. The work vehicle according to claim 12, wherein the weight is dividable into a plurality of separate members, and when the plurality of separate members are attached, lower end portions of the respective separate members are disposed at a same position in the vertical direction.

* * * * *